United States Patent
Kataoka et al.

(10) Patent No.: US 12,517,927 B2
(45) Date of Patent: Jan. 6, 2026

(54) PROCESSING METHOD, COMPUTER-READABLE RECORDING MEDIUM STORING PROCESSING PROGRAM, AND INFORMATION PROCESSING APPARATUS

(71) Applicant: FUJITSU LIMITED, Kawasaki (JP)

(72) Inventors: Masahiro Kataoka, Kamakura (JP); Ryohei Nagaura, Kobe (JP); Wai Thant Myo, Kobe (JP); Satoshi Onoue, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/617,818

(22) Filed: Mar. 27, 2024

(65) Prior Publication Data

US 2024/0241891 A1 Jul. 18, 2024

Related U.S. Application Data

(63) Continuation of application No. PCT/JP2021/036696, filed on Oct. 4, 2021.

(51) Int. Cl.
*G06F 16/00* (2019.01)
*G06F 16/22* (2019.01)
*G06F 16/28* (2019.01)

(52) U.S. Cl.
CPC ........ *G06F 16/285* (2019.01); *G06F 16/2237* (2019.01)

(58) Field of Classification Search
None
See application file for complete search history.

(56) References Cited

U.S. PATENT DOCUMENTS

| 11,036,764 B1 | 6/2021 | Zelenov et al. |
| 2012/0209847 A1 | 8/2012 | Rangan |

(Continued)

FOREIGN PATENT DOCUMENTS

| CN | 112256880 A | 1/2021 |
| JP | 2004-78446 A | 3/2004 |

(Continued)

OTHER PUBLICATIONS

WIPO, International Search Report and Written Opinion, with English-language translation of Written Opinion, mailed Dec. 7, 2021, in connection with PCT/JP2021/036696.

(Continued)

*Primary Examiner* — Anhtai V Tran
(74) *Attorney, Agent, or Firm* — Fujitsu Intellectual Property Center

(57) ABSTRACT

A processing method includes: calculating, when receiving a plurality of characters or a plurality of character strings to be registered in a database, a plurality of vectors corresponding to the plurality of characters or the plurality of character strings; classifying the plurality of vectors into a plurality of clusters according to inter-vector distances; acquiring, for each of the plurality of clusters, a representative vector which represents one or more vectors included in each cluster and a distance corresponding to a magnitude of the one or more vectors included in each cluster from the representative vector of each cluster; and storing, in a memory, dictionary information in which the representative vector and the distance are associated with cluster identification information which identifies each of the plurality of clusters.

6 Claims, 18 Drawing Sheets

(56) References Cited

U.S. PATENT DOCUMENTS

| | | | |
|---|---|---|---|
| 2013/0006636 A1* | 1/2013 | Mizuguchi | G06F 16/313 704/245 |
| 2018/0052876 A1* | 2/2018 | Liu | G06F 16/3347 |

FOREIGN PATENT DOCUMENTS

| | | |
|---|---|---|
| JP | 2005-258910 A | 9/2005 |
| JP | 2017-111479 A | 6/2017 |
| JP | 2021-022133 A | 2/2021 |

OTHER PUBLICATIONS

JPOA—Japanese Office Action mailed Dec. 3, 2024 for corresponding Japanese Patent Application No. 2023-552424 with Machine Translation [7 pages]. **References cited in the JPOA were previously submitted in the IDS filed on Apr. 5, 2024.

EESR—Extended European Search Report dated Feb. 5, 2025 for corresponding European Patent Application No. 21959842.2 [8 pages]. *References cited in the EESR was previously submitted in the IDS filed on Apr. 5, 2024.

Office Action dated Mar. 6, 2025 for corresponding Australian Patent Application No. 2021467326 (3 pages). **All references cited in the Australian Office Action have been previously submitted in the IDS and in the US Office Action.

* cited by examiner

FIG. 1

| SENTENCE | SENTENCE VECTOR |
|---|---|
| SENTENCE 1 : A HORSE LIKES A CARROT. | SV1 |
| SENTENCE 2 : A CARROT IS A FAVORITE FOOD FOR A HORSE. | SV2 |
| SENTENCE 3 : TODAY'S WEATHER IS FINE. | SV3 |
| SENTENCE 4 : A CHERRY BLOSSOM HAS BLOOMED. | SV4 |
| ... | ... |

CLUSTERING ⇒

| SENTENCE | CLUSTER ID |
|---|---|
| SENTENCE 1 : A HORSE LIKES A CARROT. | Cr1 |
| SENTENCE 2 : A CARROT IS A FAVORITE FOOD FOR A HORSE. | Cr1 |
| SENTENCE 3 : TODAY'S WEATHER IS FINE. | Cr2 |
| SENTENCE 4 : A CHERRY BLOSSOM HAS BLOOMED. | Cr3 |
| ... | ... |

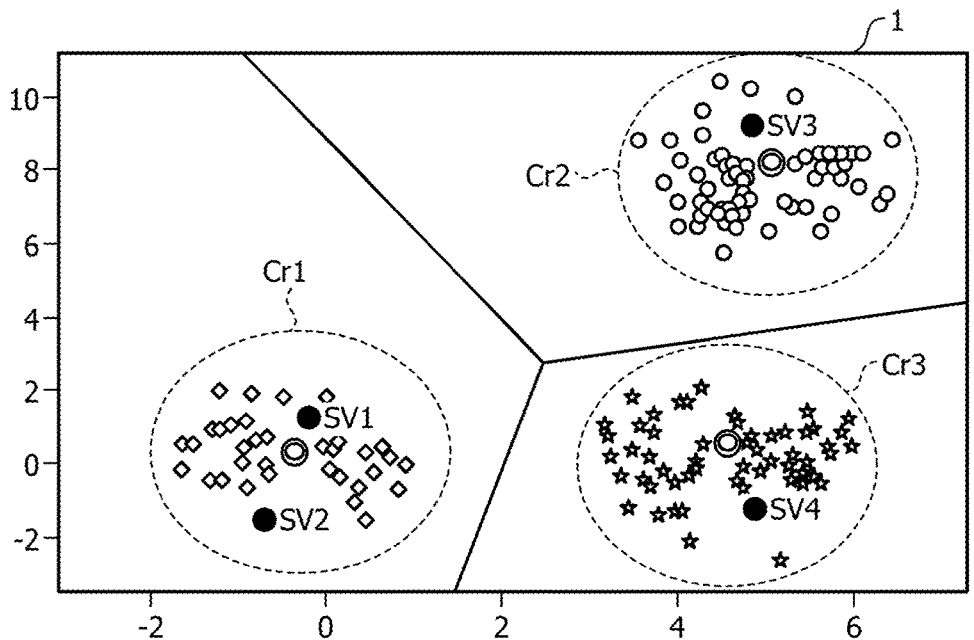

FIG. 2

| CLUSTER ID | REPRESENTATIVE VECTOR | | | | | | | DIAMETER |
|---|---|---|---|---|---|---|---|---|
| | REPRESENTATIVE VECTOR (1) | REPRESENTATIVE VECTOR (2) | REPRESENTATIVE VECTOR (3) | REPRESENTATIVE VECTOR (4) | REPRESENTATIVE VECTOR (5) | REPRESENTATIVE VECTOR (6) | REPRESENTATIVE VECTOR (7) | |
| Cr1 | 0.011 | 0.012 | 0.013 | 0.014 | 0.015 | 0.016 | 0.017 | 0.0152 |
| Cr2 | 0.021 | 0.022 | 0.023 | 0.024 | 0.025 | 0.026 | 0.027 | ... |
| Cr3 | 0.031 | 0.032 | 0.033 | 0.034 | 0.034 | 0.036 | 0.037 | ... |
| Cr4 | 0.041 | 0.042 | 0.043 | 0.044 | 0.045 | 0.046 | 0.047 | ... |
| ... | ... | ... | ... | ... | ... | ... | ... | ... |

| CLUSTER ID | CLUSTER DATA |
|---|---|
| Cr1 | CLUSTER DATA HAVING CLUSTER ID "Cr1" |
| Cr2 | CLUSTER DATA HAVING CLUSTER ID "Cr2" |
| Cr3 | CLUSTER DATA HAVING CLUSTER ID "Cr3" |
| Cr4 | CLUSTER DATA HAVING CLUSTER ID "Cr4" |
| ... | ... |

5a CLUSTER ID: Cr1

5b DIAMETER: 0.0152

5c

| REPRESENTATIVE VECTOR (1) | REPRESENTATIVE VECTOR (2) | REPRESENTATIVE VECTOR (3) | REPRESENTATIVE VECTOR (4) | REPRESENTATIVE VECTOR (5) | REPRESENTATIVE VECTOR (6) | REPRESENTATIVE VECTOR (7) |
|---|---|---|---|---|---|---|
| 0.011 | 0.012 | 0.013 | 0.014 | 0.015 | 0.016 | 0.017 |

5d

| SENTENCE VECTOR |
|---|
| SV1(0.011,0.012,0.013,0.014,0.015,0.016,0.017) |
| SV2(0.021,0.022,0.023,0.024,0.025,0.026,0.027) |
| SV135(0.031,0.032,0.033,0.034,0.035,0.036,0.037) |
| ... |

FIG. 8

| CODE | JAPANESE WORD | WORD VECTOR (1) | WORD VECTOR (2) | WORD VECTOR (3) | WORD VECTOR (4) | WORD VECTOR (5) | WORD VECTOR (6) | WORD VECTOR (7) |
|---|---|---|---|---|---|---|---|---|
| C1 | UMA | wv1-1 | wv1-2 | wv1-3 | wv1-4 | wv1-5 | wv1-6 | wv1-7 |
| C2 | HA | wv2-1 | wv2-2 | wv2-3 | wv2-4 | wv2-5 | wv2-6 | wv2-7 |
| C3 | NINJIN | wv3-1 | wv3-2 | wv3-3 | wv3-4 | wv3-5 | wv3-6 | wv3-7 |
| C4 | GA | wv4-1 | wv4-2 | wv4-3 | wv4-4 | wv4-5 | wv4-6 | wv4-7 |
| C5 | SUKI | wv5-1 | wv5-2 | wv5-3 | wv5-4 | wv5-5 | wv5-6 | wv5-7 |
| C6 | DESU | wv6-1 | wv6-2 | wv6-3 | wv6-4 | wv6-5 | wv6-6 | wv6-7 |
| C7 | , | wv7-1 | wv7-2 | wv7-3 | wv7-4 | wv7-5 | wv7-6 | wv7-7 |
| C8 | NO | wv8-1 | wv8-2 | wv8-3 | wv8-4 | wv8-5 | wv8-6 | wv8-7 |
| C9 | KOUBUTSU | wv9-1 | wv9-2 | wv9-3 | wv9-4 | wv9-5 | wv9-6 | wv9-7 |
| C10 | KYOO | wv10-1 | wv10-2 | wv10-3 | wv10-4 | wv10-5 | wv10-6 | wv10-7 |
| C11 | TENKI | wv11-1 | wv11-2 | wv11-3 | wv11-4 | wv11-5 | wv11-6 | wv11-7 |
| C12 | KAISEI | wv12-1 | wv12-2 | wv12-3 | wv12-4 | wv12-5 | wv12-6 | wv12-7 |
| ... | | | | | | | | |

FIG. 17

| JAPANESE SENTENCE | ENGLISH SENTENCE |
|---|---|
| UMA HA NINJIN GA SUKI DESU. | A HORSE LIKES A CARROT. |
| KYOO NO TENKI HA KAISEI DESU. | TODAY'S WEATHER IS FINE. |
| SAKURA NO HANA GA SAKI MASHITA. | A CHERRY BLOSSOM HAS BLOOMED. |
| ... | ... |

T1

CONVERT INTO CLUSTER ID AND MACHINE LEARNING

LEARNING MODEL

M1

PROCESSING METHOD, COMPUTER-READABLE RECORDING MEDIUM STORING PROCESSING PROGRAM, AND INFORMATION PROCESSING APPARATUS

CROSS-REFERENCE TO RELATED APPLICATION

This application is a continuation application of International Application PCT/JP2021/036696 filed on Oct. 4, 2021 and designated the U.S., the entire contents of which are incorporated herein by reference.

FIELD

The present disclosure relates to a processing method and the like.

BACKGROUND

A huge amount of data such as text is registered in a database (DB), and it is required to appropriately search for data similar to an input query designated by a user from the DB.

Related art is disclosed in Japanese Laid-Open Patent Application No. 2017-111479.

SUMMARY

According to one aspect of the embodiment, a processing method includes: calculating, when receiving a plurality of characters or a plurality of character strings to be registered in a database, a plurality of vectors corresponding to the plurality of characters or the plurality of character strings; classifying the plurality of vectors into a plurality of clusters according to inter-vector distances; acquiring, for each of the plurality of clusters, a representative vector which represents one or more vectors included in each cluster and a distance corresponding to a magnitude of the one or more vectors included in each cluster from the representative vector of each cluster; and storing, in a memory, dictionary information in which the representative vector and the distance are associated with cluster identification information which identifies each of the plurality of clusters.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram for explaining a process of a preparation phase of an information processing apparatus according to a first embodiment;

FIG. 2 is a diagram illustrating an example of a data structure of a sentence vector dictionary;

FIG. 6 is a diagram illustrating an example of a data structure of a cluster table according to the first embodiment;

FIG. 7 is a diagram illustrating an example of cluster data;

FIG. 8 is a diagram illustrating an example of a data structure of a word vector dictionary;

FIG. 17 is a diagram for explaining another application example of a sentence transposition index TS.

DESCRIPTION OF EMBODIMENTS

Figure 3:
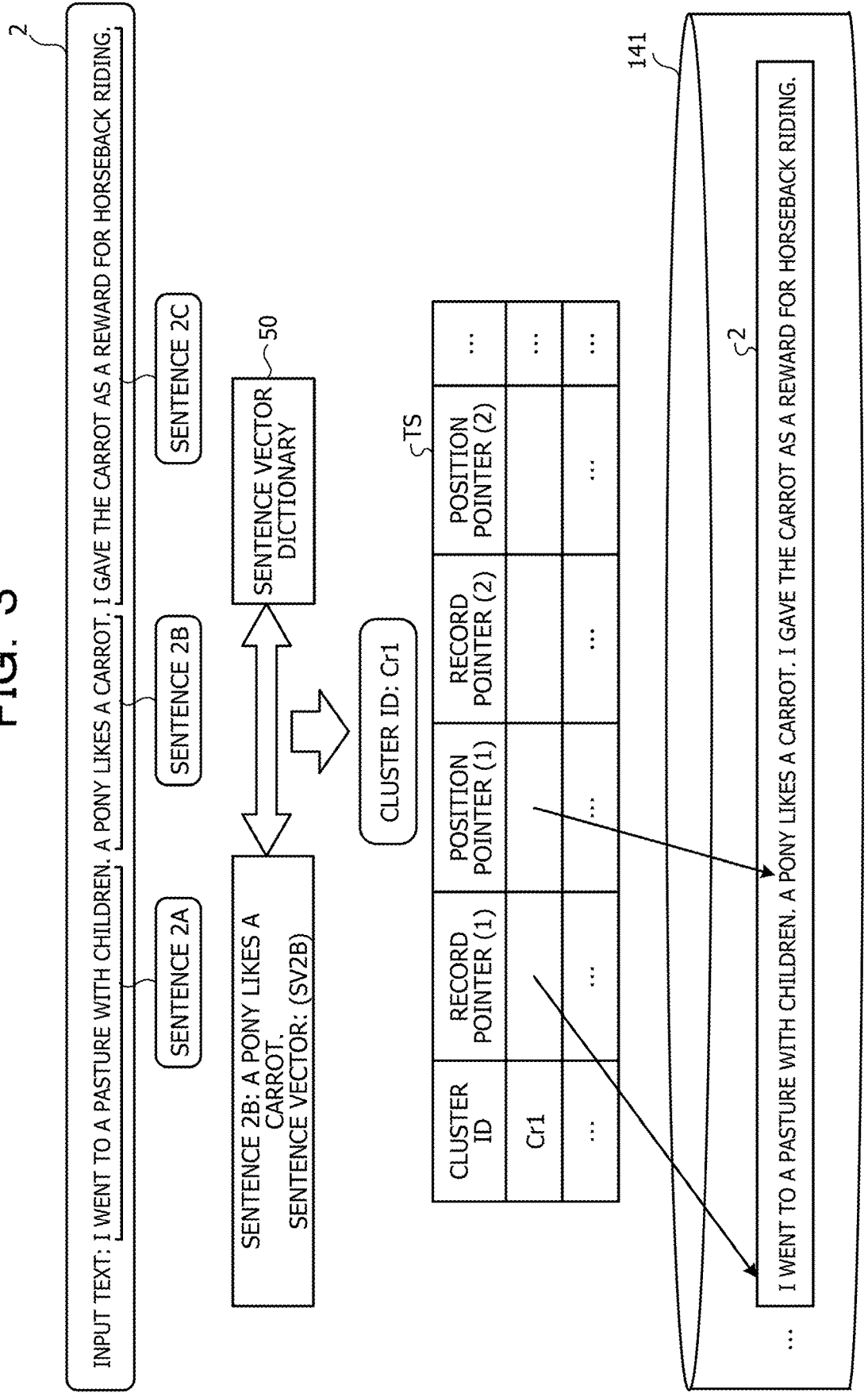
FIG. 3 is a diagram for explaining a process of a registration phase of the information processing apparatus according to the first embodiment.

For example, when the input query is received, data search is executed using a transposition index set in advance. In a preparedness, in the related art, when each text is registered in the DB, the text is morphologically analyzed, and each word is associated with position information of the corresponding text in the DB, thereby generating the transposition index. This process is repeatedly executed each time a text is newly registered in the DB.

Hereinafter, embodiments of a processing method, a processing program, and an information processing apparatus disclosed in the present application will be described in detail with reference to the drawings. Note that the present disclosure is not limited to the embodiments.

Embodiment 1

The information processing apparatus according to the first embodiment sequentially executes a process of a preparation phase, a process of a registration phase, and a process of a search phase. Hereinafter, the process of the preparation phase and the process of the search phase executed by the information processing apparatus will be described in order.

However, the above-described related art has a problem that a load of a registration process of data is large for an artificial intelligence (AI) analysis corresponding to a multidimensional vector.

In the AI analysis, when registering texts composed of character strings, chemical structural formulas of organic compounds, base sequences of genomes or the like, a necessity to assign and accumulate vectors to words, functional groups, sentences, and primary structures of the functional groups, which are meaningful units, is generated. However, in the example of text there are generally about one million types of words, and it is difficult to register the vectors and positions of the words and the sentences of all text registered in the DB in association with the transposition index. Therefore, it is necessary to narrow down a number of the vectors to be registered in the transposition index, but it takes a long time to perform a process of identifying a vector effective for a search process from a huge number of vectors.

In one aspect, an object of the present disclosure is to provide a processing method, a processing program and a information processing apparatus which are capable of reducing the load of the registration process of the data.

FIG. 1 is a diagram for explaining the process of the preparation phase of the information processing apparatus according to the first embodiment. In the first embodiment, as an example, the description is made while a sentence having a plurality of words is regarded as a text. In the description of FIG. 1, the description is given using sentence 1, sentence 2, sentence 3, and sentence 4. Note that it is assumed that the process of the preparation phase is performed on a population including a large number of sentences.

It is assumed that a sentence 1 is "A horse likes a carrot.". It is assumed that a sentence 2 is "A carrot is a favorite food for a horse.". It is assumed that a sentence 3 is "Today's weather is fine.". It is assumed that a sentence 4 is "A cherry blossom has bloomed.". Note that the sentence 1 and the sentence 2 are sentences having the same meaning although a subject (S) and an object (O) are replaced.

When receiving information on a plurality of sentences to be registered in the DB, the information processing apparatus calculates a vector of each sentence. The information processing apparatus calculates the vector of the sentence by integrating vectors of each word included in the sentence. In the following description, the vector of the sentence is referred to as a "sentence vector". The vector of each word is defined in the word vector dictionary. The vector of the word is referred to as a "word vector".

It is assumed that the sentence vector of the sentence 1 is "SV1". It is assumed that the sentence vector of the sentence 2 is "SV2". It is assumed that the sentence vector of the sentence 3 is "SV3". It is assumed that the sentence vector of the sentence 4 is "SV4". In the first embodiment, the description will be made by taking a dimension of the sentence vector as seven dimensions as an example. A vector of an n-th component of the sentence vector is denoted as a sentence vector (n) (n=1 to 7).

The information processing apparatus classifies each sentence into a plurality of clusters by performing clustering based on the sentence vector of each sentence. The clusters are arranged in a seven dimensional feature space 1. A cluster identification (ID) for uniquely identifying a cluster is set for each cluster. In the example illustrated in FIG. 1, the sentences 1 and 2 are classified into the cluster having the cluster identifier "Cr1". The sentence 3 is classified into the cluster of the cluster identifier "Cr2". The sentence 4 is classified into the cluster with the cluster identifier "Cr3".

In the following description, the clusters having the cluster IDs "Cr1" to "Cr3" are respectively referred to as clusters Cr1 to Cr3. Although the clusters Cr1 to Cr3 are illustrated in FIG. 1, the feature space 1 may include another cluster.

The information processing apparatus generates a sentence vector dictionary based on a result of the clustering. FIG. 2 is a diagram illustrating an example of a data structure of the sentence vector dictionary. As illustrated in FIG. 2, the sentence vector dictionary 50 associates the cluster ID, a representative vector, and a diameter with each other.

The cluster ID is information for uniquely identifying the cluster. The representative vector is a vector representing the sentence vectors included in the same cluster. The representative vectors include representative vectors (1) to (7). The representative vector (n) is a vector corresponding to a center (centroid) of the sentence vectors (n) belonging to the same cluster (n=1 to 7). The diameter indicates a diameter (length of a side) of a sphere (cube) of the cluster or the like.

FIG. 3 is a diagram for explaining the process of the registration phase of the information processing apparatus according to the first embodiment. When receiving an input text 2 to be registered in a DB 141, the information processing apparatus generates the sentence transposition index TS based on each sentence included in the input text 2 and a sentence vector dictionary 50.

In the example illustrated in FIG. 3, it is assumed that the input text 2 is "I went to a pasture with children. A pony likes a carrot. I gave the carrot as a reward for a horseback riding.". For convenience of description, "I went to a pasture with children." among the sentences included in the input text 2 is referred to as a sentence 2A. "A pony likes a carrot." is referred to as a sentence 2B. "I gave the carrot as a reward for a horseback riding." is referred to as a sentence 2C.

The description will be made by using the sentence 2B "A Pony likes a carrot". The information processing apparatus calculates a sentence vector "SV2B" by integrating the word vectors of the words included in the sentence 2B. The information processing apparatus compares the sentence vector of the sentence 2B with the representative vectors of the sentence vector dictionary 50 to specify the cluster ID to which the sentence 2B belongs.

For example, the information processing apparatus calculates the similarity (cosine similarity or distance) between the sentence vector and the representative vector, specifies the representative vector having the highest similarity to the sentence vector, and sets the cluster ID of the specified representative vector as the cluster ID to which the sentence 2B belongs.

When the similarity between the sentence vector "SV2B" of the sentence 2B and the representative vector of the cluster is the maximum, the information processing apparatus specifies the cluster ID to which the sentence 2B belongs as "Cr1".

The information processing apparatus registers the input text 2 in the DB 141 by the unit of record. The information processing apparatus registers the cluster ID, a record pointer, and a position pointer in the sentence transposition index TS in association with each other. The record pointer indicates a position of a record on the DB 141 in which a text having a sentence belonging to the corresponding cluster is registered, and indicates a position from a head of the DB 141. The position pointer indicates a position on the record of the DB 141 in which the sentence belonging to the corresponding cluster is registered, and indicates a relative position from the record pointer.

For example, when the sentence vector "SV2B" of the sentence 2B belongs to the cluster Cr1, a head position (a position from the head of DB 141) of the corresponding record of DB 141 in which the input text 2 is registered is set in the record pointer (1) in the sentence transposition index TS. The position of the sentence 2B registered in the corresponding record of the DB 141 (a relative position from the head of the corresponding record) is set in the position pointer (1). When other information has been already registered in the record pointer (m) and the position pointer (m) corresponding to the same cluster ID, the information processing apparatus registers the information described above in the record pointer (m+1) and the position pointer (m+1). m corresponds to a natural number.

The information processing apparatus specifies the cluster IDs based on the sentence vectors for the sentences 2A and 2C in the same manner as for the sentence 2B, and registers the cluster IDs, the record pointers, and the position pointers in the sentence transposition index TS in association with one another.

The information processing apparatus repeatedly executes the above process and updates the sentence transposition index TS even when acquiring another input text to be registered in the record of the DB 141.

As described above, when registering the input text 2 in the record of DB 141, the information processing apparatus according to the first embodiment specifies which cluster ID the sentences of the input text belong to by using the sentence vector dictionary 50, and generates the sentence transposition index TS based on the specified result. In this way, by using the sentence vector dictionary 50 in which the representative vector and the diameter of each cluster of the sentence are stored in advance, the sentence and the cluster ID may be easily associated with each other, and thus the load of the registration process of the data may be reduced.

Figure 4:
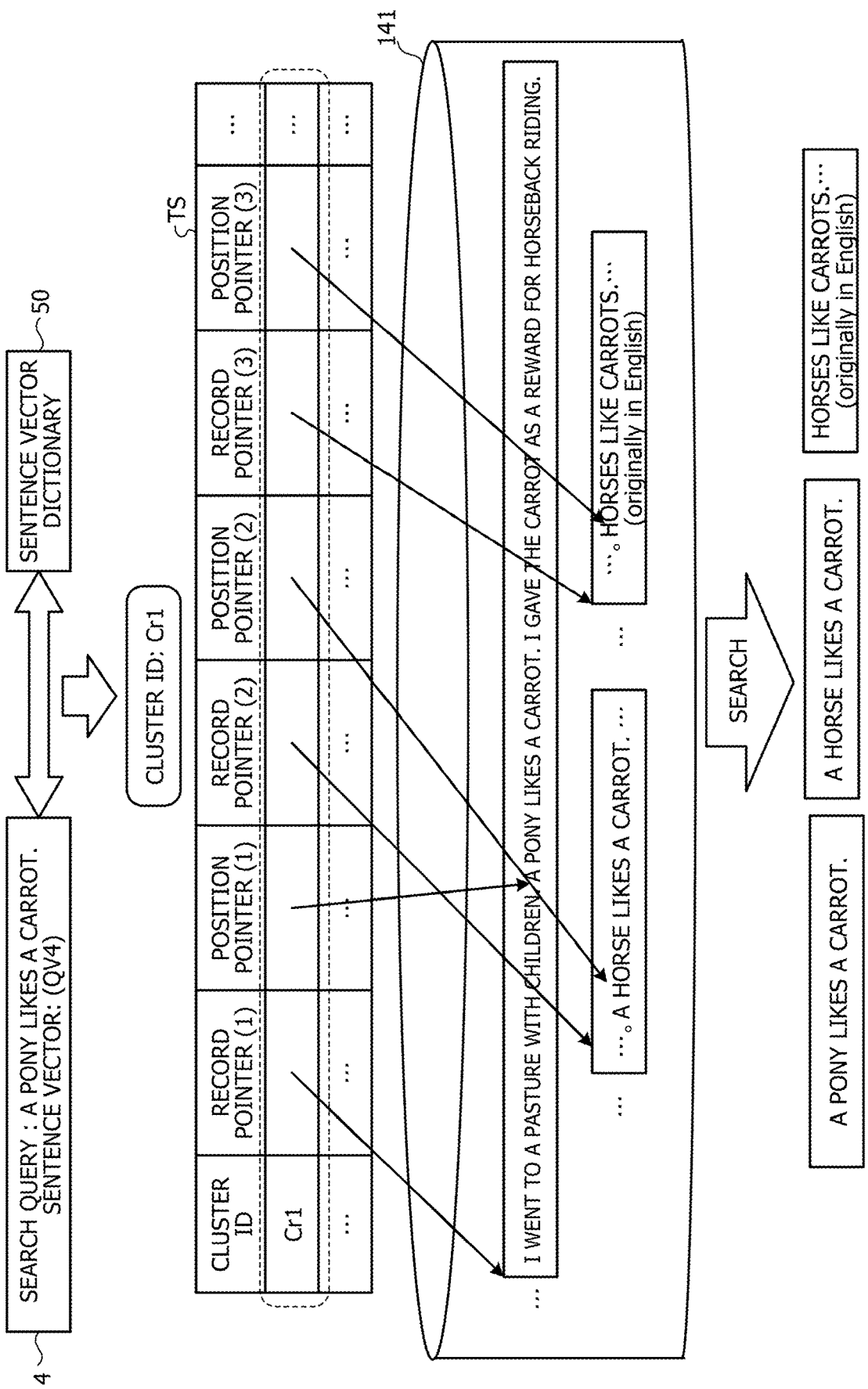
FIG. 4 is a diagram for explaining a process of a search phase of the information processing apparatus according to the first embodiment.

Next, the process of the search phase will be described. FIG. 4 is a diagram for explaining the process of the search phase of the information processing apparatus according to the first embodiment. When receiving a search query, the information processing apparatus searches for a sentence based on the search query and the sentence transposition index TS.

In FIG. 4, the description will be given while the search query 4 is "A pony likes a carrot. The information processing apparatus calculates a sentence vector "QV4" by integrating the word vectors of the words included in the search query 4. The information processing apparatus compares the sentence vector of the search query 4 with the representative vector of the sentence vector dictionary 50 and specifies the cluster ID to which the search query 4 belongs.

For example, the information processing apparatus calculates the similarity (cosine similarity or distance) between the sentence vector "QV4" of the search query 4 and the representative vector. The information processing apparatus specifies a representative vector having the highest similarity to the sentence vector "QV4" and sets the cluster ID of the specified representative vector as the cluster ID to which the search query 4 belongs. Here, the description will be given assuming that the cluster ID to which the search query 4 belongs is "Cr1".

The information processing apparatus compares the cluster ID "Cr1" to which the search query 4 belongs with the sentence transposition index TS, and searches for a sentence corresponding to the search query 4 from DB 141. For example, the information processing apparatus may extract a sentence "A pony likes a carrot." indicated by the record pointer (1) and the position pointer (1) set in a row of the cluster ID "Cr1".

The information processing apparatus extracts a sentence "A horse likes a carrot." indicated by a record pointer (2) and a position pointer (2) set in the row of the cluster ID "Cr1". The information processing apparatus extracts a sentence "Horses like carrots.", which is an originally-English sentence, indicated by a record pointer (3) and a position pointer (3) set in the row of the cluster ID "Cr1".

Although not described, the information processing apparatus extracts a statement indicated by a record pointer (m) and a position pointer (m) set in the row of the cluster ID "Cr1".

As in the above process, the information processing apparatus may efficiently search for the sentence corresponding to the search query 4 by using the cluster ID to which the search query 4 belongs and the sentence transposition index TS. In the example described in FIG. 4, the information processing apparatus searches the sentence "A pony likes a carrot.", the sentence "A horse likes a carrot." and the sentence, which is the originally—English sentence, "Horses like carrots.", corresponding to the search query 4.

Figure 5:
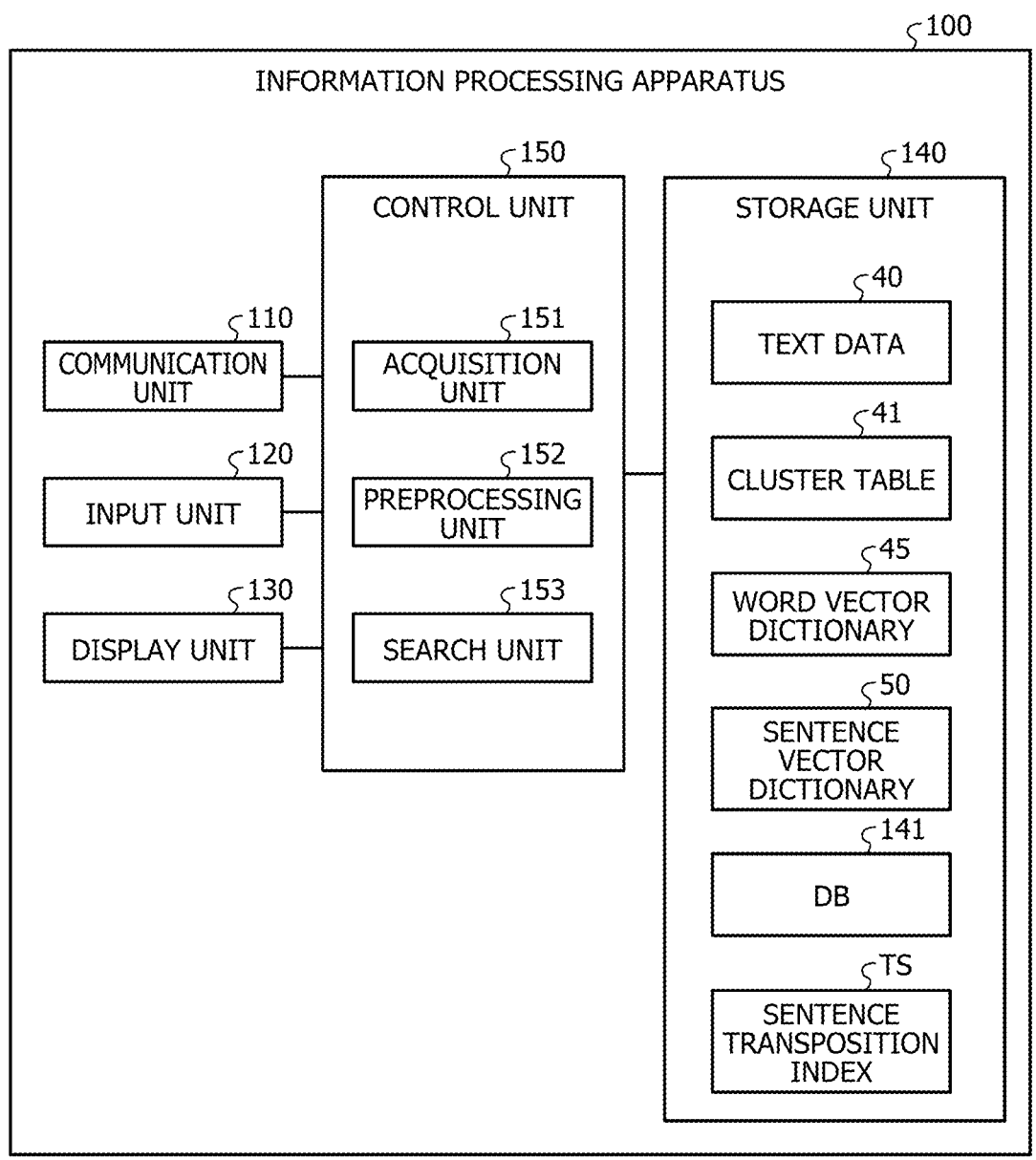
FIG. 5 is a functional block diagram illustrating a configuration of the information processing apparatus according to the first embodiment.

Next, an example of the configuration of the information processing apparatus according to the first embodiment will be described. FIG. 5 is a functional block diagram illustrating the configuration of the information processing apparatus according to the first embodiment. As illustrated in FIG. 5, an information processing apparatus 100 includes a communication unit 110, an input unit 120, a display unit 130, a storage unit 140, and a control unit 150.

The communication unit 110 is coupled to an external device or the like in a wired or wireless manner, and transmits and receives information to and from the external device or the like. For example, the communication unit 110 is realized by a network interface card (NIC) or the like. The communication unit 110 may be coupled to a network (not illustrated).

The input unit 120 is an input device that inputs various kinds of information to the information processing apparatus 100. The input unit 120 corresponds to a keyboard, a mouse, a touch panel, or the like. For example, a user may input a search query or the like by operating the input unit 120.

The display unit 130 is a display device that displays information output from the control unit 150. The display unit 130 corresponds to a liquid crystal display, an organic electro luminescence (EL) display, a touch panel, or the like. For example, the search result corresponding to the search query is displayed on the display unit 130.

The storage unit 140 includes a text data 40, a cluster table 41, a word vector dictionary 45, a sentence vector dictionary 50, the DB 141, and the sentence transposition index TS. The storage unit 140 is implemented by, for example, a semiconductor memory device such as a random access memory (RAM) or a flash memory, or a storage device such as a hard disk or an optical disk.

The text data 40 is information used to generate the sentence vector dictionary 50. For example, the text data 40 includes a sentence included in Aozora Bunko or the like, a paper published on the network, or the like. The sentences included in the text data 40 correspond to the sentence 1 to the sentence 4 described in FIG. 1 or the like.

The cluster table 41 holds information about clusters. FIG. 6 is a diagram illustrating an example of a data structure of the cluster table according to the first embodiment. As illustrated in FIG. 6, the cluster table 41 associates a cluster ID with cluster data. The cluster ID is information for uniquely identifying a cluster.

The cluster data includes information on the sentence vectors included in the corresponding cluster or the like. FIG. 7 is a diagram illustrating an example of cluster data. In FIG. 7, the cluster having the cluster ID "Cr1" is described. As illustrated in FIG. 7, the cluster data 5 includes areas 5a and 5b and tables 5c and 5d. The cluster ID "Cr1" is set in the area 5a. The diameter of the cluster (cluster Cr1) is set in the area 5b.

The representative vectors (1) to (7) of the cluster (cluster Cr1) are set in the table 5c. In the table 5d, the sentence vectors belonging to the cluster Cr1 are registered. The representative vectors (1) to (7) are calculated based on the sentence vectors registered in the table 5d. The representative vector (n) is a vector indicating a center of a vector of a n-th component of each vector of the table 5d.

Although not illustrated, it is assumed that the other cluster data illustrated in FIG. 6 also has information similar to the information described in FIG. 7.

The description returns to FIG. 5. The word vector dictionary 45 is a table that defines codes and word vectors assigned to words. FIG. 8 is a diagram illustrating an example of a data structure of the word vector dictionary. As illustrated in FIG. 8, the word vector dictionary 45 includes a code, a word, and word vectors (1) to (7). The code is a code assigned to the word. The word is a word included in the character string. The word vectors (1) to (7) are vectors assigned to the word. The n-th component of the word vector is denoted as a word vector (n) (n=1 to 7).

The sentence vector dictionary 50 corresponds to the sentence vector dictionary 50 described with reference to FIG. 2. As described with reference to FIG. 2, the cluster ID, the representative vector, and the diameter are associated with each other in the sentence vector dictionary 50.

The DB 141 registers the input text and the like.

The sentence transposition index TS corresponds to the sentence transposition index TS described with reference to FIGS. 3 and 4. The sentence transposition index TS associates the cluster ID with a set of the record pointer and the position pointer. A plurality of sets of the record pointer and the position pointer may be registered in one cluster ID.

The description returns to FIG. 5. The control unit 150 includes an acquisition unit 151, a preprocessing unit 152, and a search unit 153. The control unit 150 is implemented by, for example, a central processing unit (CPU) or a micro processing unit (MPU). Further, the control unit 150 may be implemented by an integrated circuit such as an application specific integrated circuit (ASIC) or a field programmable gate array (FPGA).

The acquisition unit 151 acquires various data via the communication unit 110 and the input unit 120. For example, the acquisition unit 151 acquires the text data 40 and registers the text data 40 in the storage unit 140.

The preprocessing unit 152 generates the sentence transposition index TS based on the text data 40. The preprocessing unit 152 sequentially executes a process of calculating the sentence vector, a process of generating the sentence vector dictionary, and a process of generating the sentence transposition index TS.

Figure 9:
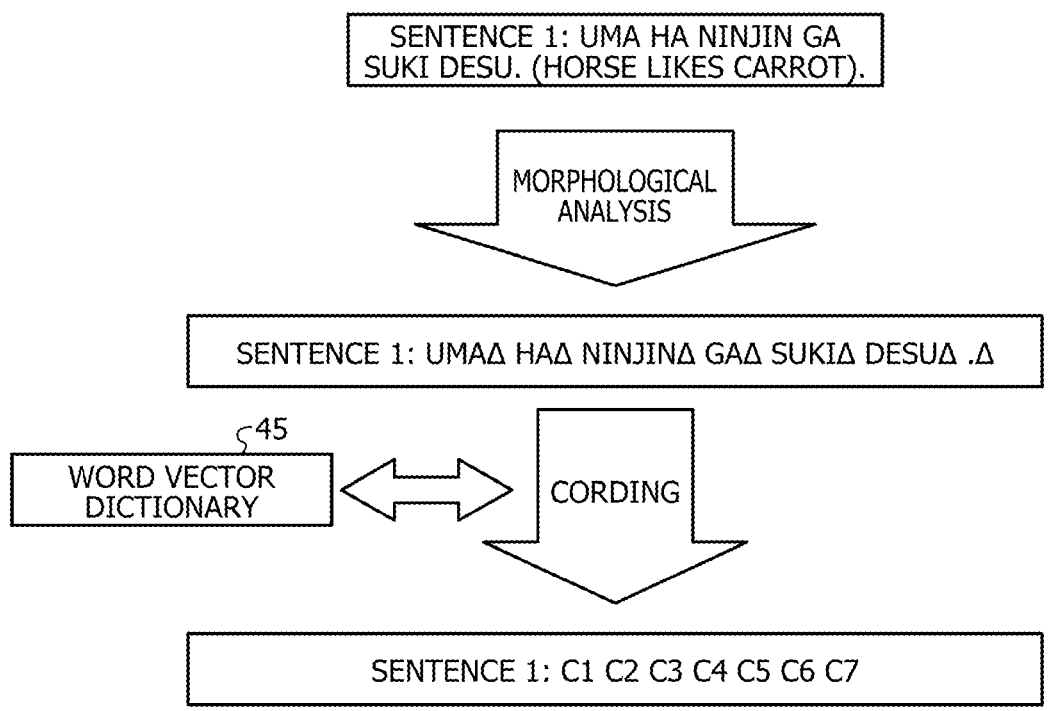
FIG. 9 is a diagram (1) for explaining a process of calculating a sentence vector.
Figure 10:
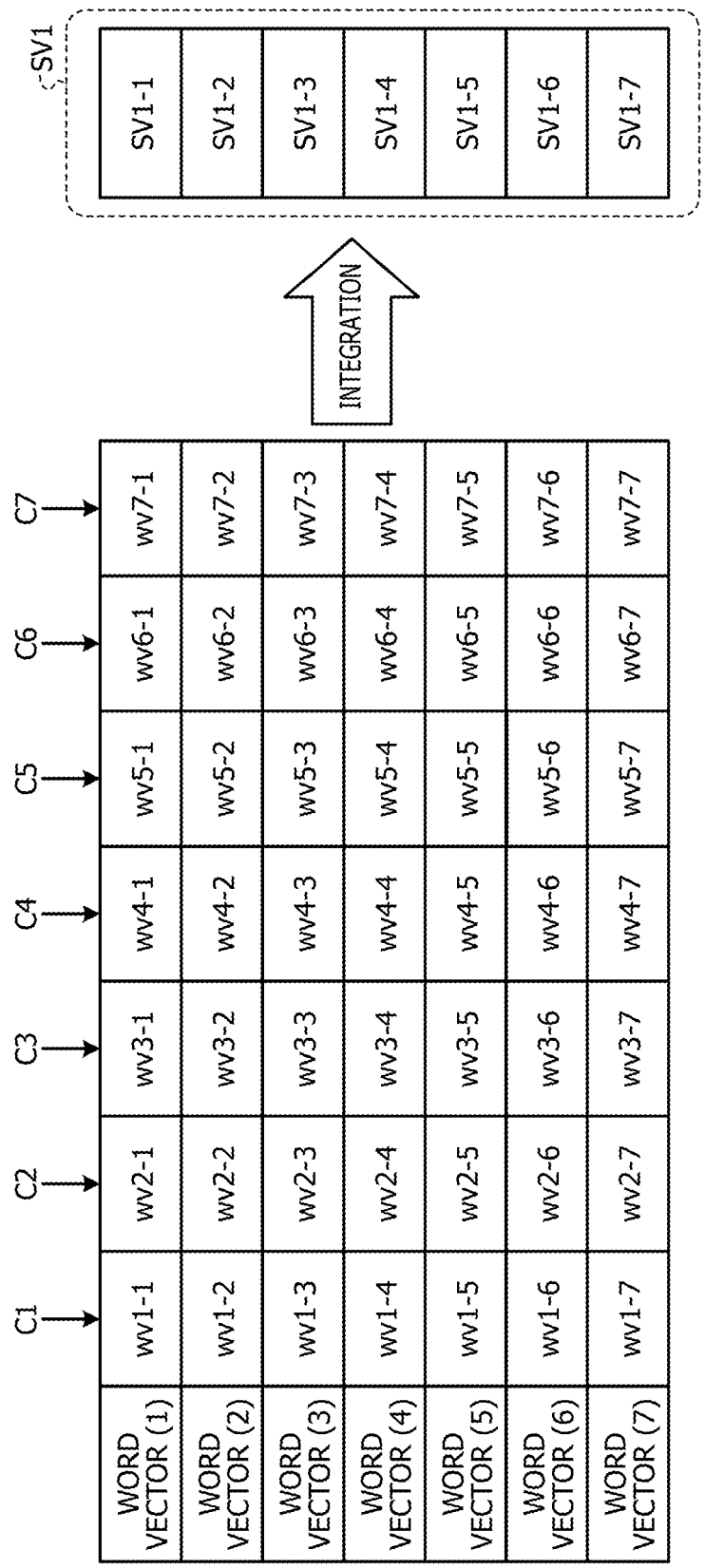
FIG. 10 is a diagram (2) for explaining the process of calculating the sentence vector.

The process of calculating the sentence vector executed by the preprocessing unit 152 will be described. FIGS. 9 and 10 are diagrams for explaining the process of calculating the sentence vector. The description will be made with reference to FIG. 9. In FIG. 9, a case will be described in which the preprocessing unit 152 extracts the sentence 1 "A horse likes a carrot." which is included in the text data 40 and calculates the sentence vector of the sentence 1.

The preprocessing unit 152 executes a morphological analysis on the sentence 1 "A horse likes a carrot." and decomposes the sentence 1 into a plurality of words. Each of the words obtained by the decomposition is given "Δ (space)". For example, the sentence 1 "A horse likes a carrot." which is obtained by translating a Japanese sentence expressed by "Uma ha ninjin ga suki desu." is decomposed into "Uma Δ", "Ha Δ", "Ninjin Δ", "Ga Δ", "Suki Δ", "Desu Δ" and ".Δ" in Japanese.

The preprocessing unit 152 compares each of the decomposed words with the word vector dictionary 45 to specify a code corresponding to each word and replaces the code with the word. For example, the words "Uma Δ", "Ha Δ", "Ninjin Δ", "Ga Δ", "Suki Δ", "Desu Δ" and ".Δ" in Japanese are replaced with "C1", "C2", "C3", "C4", "C5", "C6", and "C7", respectively.

The description will proceed to FIG. 10. The preprocessing unit 152 specifies the word vectors (1) to (7) assigned to the codes based on the word vector dictionary 45 and each code. For example, it is assumed that the word vectors (1) to (7) of the code "C1" are wv1-1 to 1-7. The word vectors (1) to (7) of the code "C2" are wv2-1 to 2-7. The word vectors (1) to (7) of the code "C3" are wv3-1 to 3-7.

It is assumed that the word vectors (1) to (7) of the code "C4" are wv4-1 to 4-7. It is assumed that the word vectors (1) to (7) of the code "C5" are wv5-1 to 5-7. It is assumed that the word vectors (1) to (7) of the code "C6" are wv6-1 to 6-7. It is assumed that the word vectors (1) to (7) of the code "C7" are wv7-1 to 7-7.

The preprocessing unit 152 calculates the sentence vector SV1 of the sentence 1 by integrating the word vectors for the respective elements. For example, the preprocessing unit 152 calculates the first component "SV1-1" of the sentence vector SV1 by integrating wv1-1 to 7-1 that are each of the word vectors (1). The preprocessing unit 152 integrates wv1-2 to 7-2 that are each of the word vectors (2) to calculate the second component "SV1-2" of the sentence vector SV1. The third component "SV1-3" of the sentence vector SV1 is calculated by integrating wv1-3 to 7-3 which are each of the word vectors (3).

The preprocessing unit 152 integrates wv1-4 to 7-4 that are each of the word vectors (4) to calculate the fourth component "SV1-4" of the sentence vector SV1. The preprocessing unit 152 integrates wv1-5 to 7-5, which are each of the word vectors (5), to calculate the fifth component "SV1-5" of the sentence vector SV1. The preprocessing unit 152 integrates wv1-6 to 7-6, which are each of the word vectors (6), to calculate the sixth component "SV1-6" of the sentence vector SV1. The preprocessing unit 152 integrates wv1-7 to 7-7 that are each of the word vectors (7) to calculate the seventh component "SV1-7" of the sentence vector SV1.

The preprocessing unit 152 also repeatedly executes the above process for each sentence included in the text data 40 to calculate the sentence vector of each sentence.

Next, a process of generating the sentence vector dictionary 50 executed by the preprocessing unit 152 will be described. The process of generating the sentence vector dictionary 50 by the preprocessing unit 152 corresponds to the process described with reference to FIGS. 1 and 2. The preprocessing unit 152 classifies each sentence into a plurality of clusters by performing clustering based on the sentence vector calculated by the above process.

The preprocessing unit 152 generates cluster data for each cluster, and registers the cluster ID and the cluster data in the cluster table 41 in association with each other. In this example, the description will be made in which the cluster data of the cluster Cr1 (cluster identifier "Cr1") described with reference to FIG. 7 is generated. The preprocessing unit 152 sets the sentence vectors belonging to the cluster Cr1 in the table 5d in the feature space.

The preprocessing unit 152 calculates the centers of each of the components of each of the sentence vectors set in the table 5d to calculate the representative vectors (1) to (7) and sets the representative vectors in the table 5c. The preprocessing unit 152 sets a minimum sphere including all the sentence vectors belonging to the cluster Cr1 in the feature space. The preprocessing unit 152 registers the diameter of the set sphere in the area 5d.

The preprocessing unit 152 repeatedly executes the above process for other clusters to generate the cluster data of each cluster and registers the cluster data in the cluster table 41.

The preprocessing unit 152 extracts the cluster ID, the representative vectors (1) to (7), and the diameter from the cluster table 41, and registers the cluster ID, the representative vectors (1) to (7), and the diameter in the sentence vector dictionary 50.

Next, a process of generating the sentence transposition index×TS executed by the preprocessing unit 152 will be described. The process of generating the sentence transposition index TS by the preprocessing unit 152 corresponds to the process described with reference to FIG. 3. When the preprocessing unit 152 receives the input text 2 to be registered in the DB 141, the preprocessing unit 140 generates the sentence transposition index TS based on each sentence included in the input text 2 and the sentence vector dictionary 50.

The description will be made using the sentence 2B in FIG. 3 "A Pony likes a carrot.2". The preprocessing unit 152 calculates the sentence vector "SV2B" by integrating the word vectors of the words included in the sentence 2B. The preprocessing unit 152 calculates the sentence vector "SV2B" of the sentence 2B in the same manner as the process of calculating the sentence vector described above. The preprocessing unit 152 compares the sentence vector of the sentence 2B with the representative vector in the sentence vector dictionary 50 to identify the cluster ID to which the sentence 2B belongs.

For example, the preprocessing unit 152 calculates the similarity (cosine similarity or distance) between the sentence vector "SV2B" and the representative vector, and specifies the representative vector having the highest similarity to the sentence vector "SV2B". The preprocessing unit 152 sets the cluster ID of the identified representative vector as the cluster ID to which the sentence 2B belongs.

When the similarity between the sentence vector "SV2B" of the sentence 2B and the representative vector of the cluster Cr1 is the maximum, the preprocessing unit 152 specifies the cluster ID to which the sentence 2B belongs as "Cr1".

Figure 11:
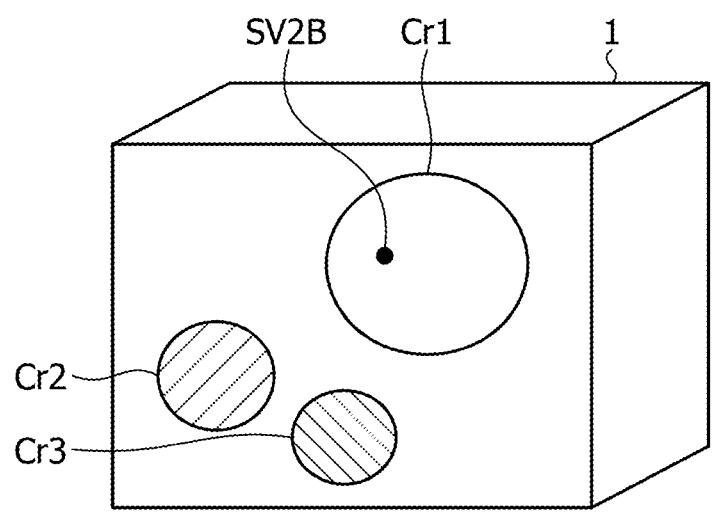
FIG. 11 is a diagram (1) for explaining a process of specifying a cluster ID.
Figure 12:
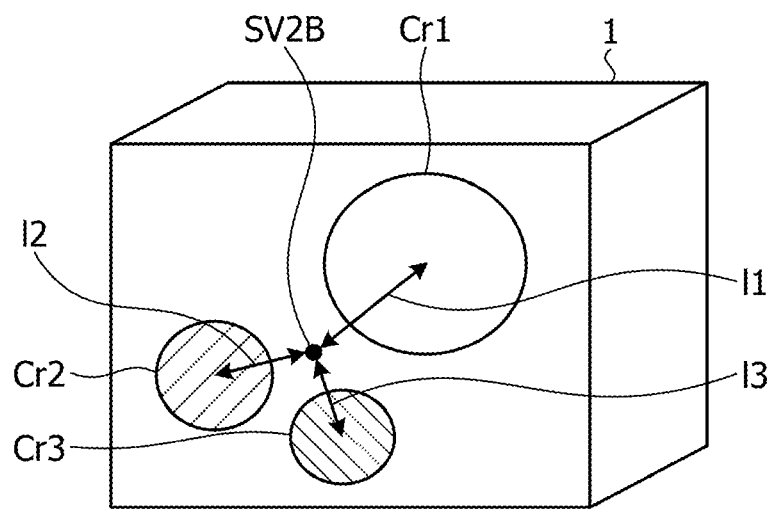
FIG. 12 is a diagram (2) for explaining the process of specifying the cluster ID.

FIGS. 11 and 12 are diagrams for explaining a process for specifying the cluster ID. In FIG. 11, the feature space 1 includes clusters Cr1, Cr2, and Cr3. For example, as illustrated in FIG. 11, when the sentence vector SV2B of the sentence 2B is included in an area of the cluster Cr1, the preprocessing unit 152 specifies the cluster ID to which the sentence 2B belongs as "Cr1".

In FIG. 12, the feature space 1 includes clusters Cr1, Cr2, and Cr3. For example, as illustrated in FIG. 12, when the sentence vector SV2B of the sentence 2B is not included in the area of the clusters Cr1, Cr2, and Cr3, the preprocessing unit 152 performs the following process. The preprocessing unit 152 calculates a distance l1 between the sentence vector SV2B and a surface of the cluster Cr1, a distance l2 between the sentence vector SV2B and the surface of the cluster Cr2, and a distance l3 between the sentence vector SV2B and the surface of the cluster Cr3, respectively.

The preprocessing unit 152 specifies the cluster ID of the cluster corresponding to the shortest distance among the distances l1 to l3 as the cluster ID to which the sentence 2B belongs. For example, when the distance l2 is the shortest distance among the lengths l1 to l3, the preprocessing unit 152 sets the cluster ID to which the sentence 2B belongs to "Cr2".

The preprocessing unit 152 registers the input text 2 in the DB 141. The preprocessing unit 152 registers the cluster ID, the record pointer, and the position pointer in the sentence transposition index TS in association with each other.

For example, when the sentence vector "SV2B" of the sentence 2B belongs to the cluster Cr1, a head position of the input text 2 registered in the DB 141 (position from the head of the DB 141) is set in the record pointer (1) in the sentence transposition index TS. The position of the sentence 2B registered in the DB 141 (relative position from the record pointer) is set in the position pointer (1). When other information has been already registered in the record pointer (m) and the position pointer (m) corresponding to the same cluster ID, the preprocessing unit 152 registers the above-described information in the record pointer (m+1) and the position pointer (m+1). M corresponds to a natural number.

The preprocessing unit 152 specifies cluster ID for the sentence 2A and the sentence 2C based on the sentence vector in the same manner as the sentence 2B, and registers the cluster ID, the record pointer, and the position pointer in the sentence transposition index TS in association with each other.

The preprocessing unit 152 repeatedly executes the above process and updates the sentence transposition index TS also when acquiring another input text to be registered in the record of the DB 141. Further, the preprocessing unit 152 may register each sentence of the text data 40 in the record of the DB 141 and update the sentence transposition index TS in the same manner as the sentence 2B.

The description returns to FIG. 5. When a search query is received, the search unit 153 searches for a sentence corresponding to the search query from each record of the DB 141 based on the search query and the sentence transposition index TS. The process of the search unit 153 corresponds to the process described in FIG. 4.

A process in a case where the search unit 153 acquires a search query 4 "A pony likes a carrot." will be described below. The search unit 153 calculates the sentence vector "QV4" by integrating the word vectors of the words included in the search query 4. The process of calculating the sentence vector of the search query 4 by the search unit 153 is the same as the process of calculating the sentence vector by the preprocessing unit 152.

The search unit 153 compares the sentence vector "QV4" of the search query 4 with the representative vector in the sentence vector dictionary 50 and specifies the cluster ID to which the search query 4 belongs.

For example, the search unit 153 calculates the similarity (cosine similarity or difference) between the sentence vector "QV4" of the search query 4 and the representative vector. The search unit 153 specifies the representative vector having the highest similarity to the sentence vector "QV4" and sets the cluster ID of the specified representative vector as the cluster ID to which the search query 4 belongs. Here, the description will be given assuming that the cluster ID to which the search query 4 belongs is "Cr1".

The search unit 153 compares the cluster ID "Cr1" to which the search query 4 belongs with the sentence transposition index TS, and searches the DB 141 for a sentence corresponding to the search query 4. For example, the search unit 153 extracts the sentence "A pony likes a carrot." indicated by the record pointer (1) and the position pointer (1) set in the row of the cluster ID "Cr1".

The search unit 153 extracts the sentence "A horse likes a carrot." indicated by the record pointer (2) and the position pointer (2) set in the row of the cluster ID "Cr1". The search unit 153 extracts the sentence "Horses like carrots.", which is the originally-English sentence, indicated by the record pointer (3) and the position pointer (3) set in the row of the cluster ID "Cr1".

Although not described, the search unit 153 extracts a sentence indicated by the record pointer (m) and the position pointer (m) set in the row of the cluster ID "Cr1".

The search unit 153 outputs the search result to the display unit 130 to display the search result. The search unit 153 repeatedly executes the above process every time the search query 4 is received.

Figure 13:
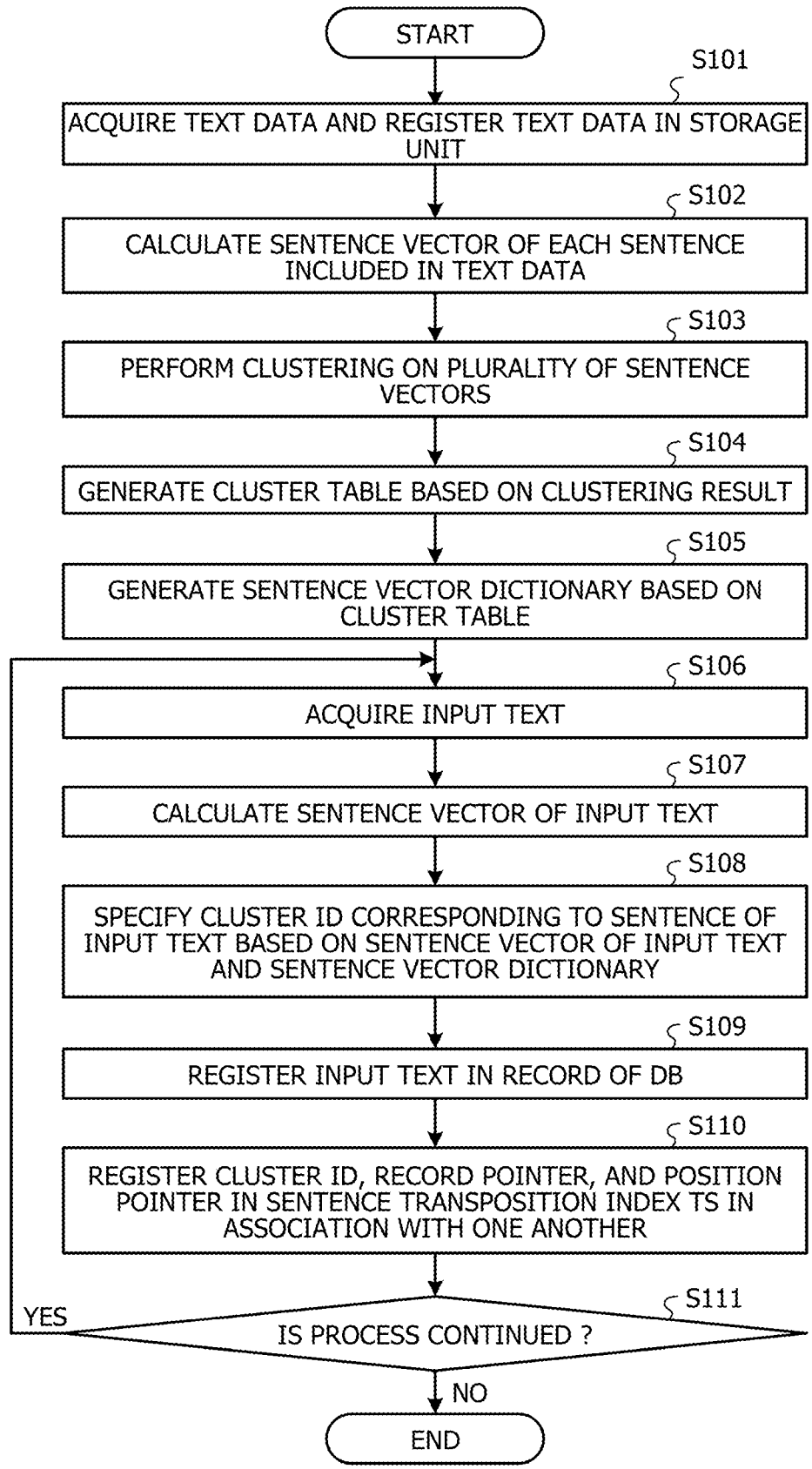
FIG. 13 is a flowchart illustrating a processing procedure of a preparation process.

Next, an example of a processing procedure of the information processing apparatus 100 will be described. FIG. 13 is a flowchart illustrating a procedure of the preparation process. As illustrated in FIG. 13, the acquiring unit 151 of the information processor 100 acquires the text data 40 and registers the text data 40 in the storage unit 140 (step S101).

The preprocessing unit 152 of the information processing apparatus 100 calculates a sentence vector of each sentence included in the text data 40 (step S102). The preprocessing unit 152 performs clustering on the plurality of sentence vectors (step S103).

The preprocessing unit 152 generates the cluster table 41 based on a clustering result (step S104). The preprocessing unit 152 generates a sentence vector dictionary based on the cluster table 41 (step S105).

The preprocessing unit 152 acquires an input text to be registered in the DB 141 (step S106). The preprocessing unit 152 calculates the sentence vector of the input text (step S107). The preprocessing unit 152 specifies the cluster ID corresponding to the sentence of the input text based on the sentence vector of the input text and the sentence vector dictionary 50 (step S108).

The preprocessing unit 152 registers the input text in the record of the DB 141 (step 5109). The preprocessing unit 152 registers the cluster ID, the record pointer, and the position pointer in the sentence transposition index TS in association with one another (step S110).

When the preprocessing unit 152 continues the process (Yes at step S111), the preprocessing unit 152 proceeds to step S106. On the other hand, when the preprocessing unit 152 does not continue the process (No at step S111), the preprocessing unit 152 ends the process.

Figure 14:
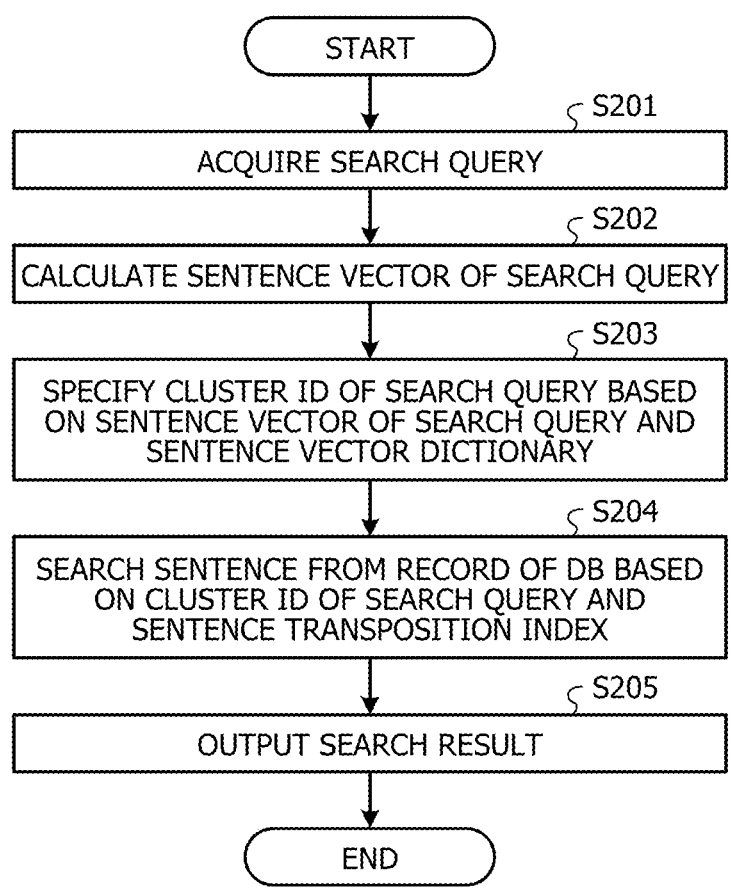
FIG. 14 is a flowchart illustrating a processing procedure of a search process.

FIG. 14 is a flowchart of a procedure of the search process. As illustrated in FIG. 14, the acquisition unit 151 of the information processing apparatus 100 acquires a search query (step S201).

The search unit 153 of the information processing apparatus 100 calculates a sentence vector of the search query (step S202). The search unit 153 specifies the cluster ID of the search query based on the sentence vector of the search query and the sentence vector dictionary 50 (step S203).

The search unit 153 searches for a sentence from the record of the DB 141 based on the cluster ID of the search query and the sentence transposition index (step S204). The search unit 153 outputs the search result to the display unit 130 (step S205).

Next, the effect of the information processing apparatus 100 according to the first embodiment will be described. The information processing apparatus 100 calculates the sentence vectors of the plurality of sentences included in the text data 40 and performs clustering to generate information on the plurality of clusters and generate the sentence vector dictionary 50. In the sentence vector dictionary 50, the cluster ID is associated with the representative vector and the diameter. For example, when registering a new input text in the record of the DB 141, the information processor 100 may easily assign the cluster ID to which the sentence vector of the input text belongs by comparing the sentence vector of the input text with the representative vector and the diameter in the sentence vector dictionary 50.

When registering the input text 2 in the record of the DB 141, the information processing apparatus 100 specifies which cluster ID the sentence of the input text belong to by using the sentence vector dictionary 50, and generates the sentence transposition index TS by associating the specified cluster ID with the stored record and the position information of the sentence. In this way, since the sentence and the cluster ID may be easily associated with each other by using the sentence vector dictionary 50, it is possible to reduce the load of the registration process related to the sentence transposition index TS.

When receiving the search query, the information processing apparatus 100 specifies the cluster ID corresponding to the search query based on the search query and the sentence vector dictionary, and specifies the position of the sentence corresponding to the search query based on the specified cluster ID and the sentence transposition index TS. Thus, the sentence corresponding to the search query may be efficiently searched. For example, when a plurality of pieces of position information (record pointers and position pointers) are associated with the cluster ID, the plurality of pieces of position information may be specified at once, and the sentence corresponding to the search query may be efficiently searched for.

Example 2

In the first embodiment described above, the clustering is executed with the granularity of the sentence vector to generate the sentence transposition index, but the present disclosure is not limited thereto, and a transposition index (corresponding to the second word transposition index WS2 described later) may be generated with the granularity of the word vector.

Figure 15:
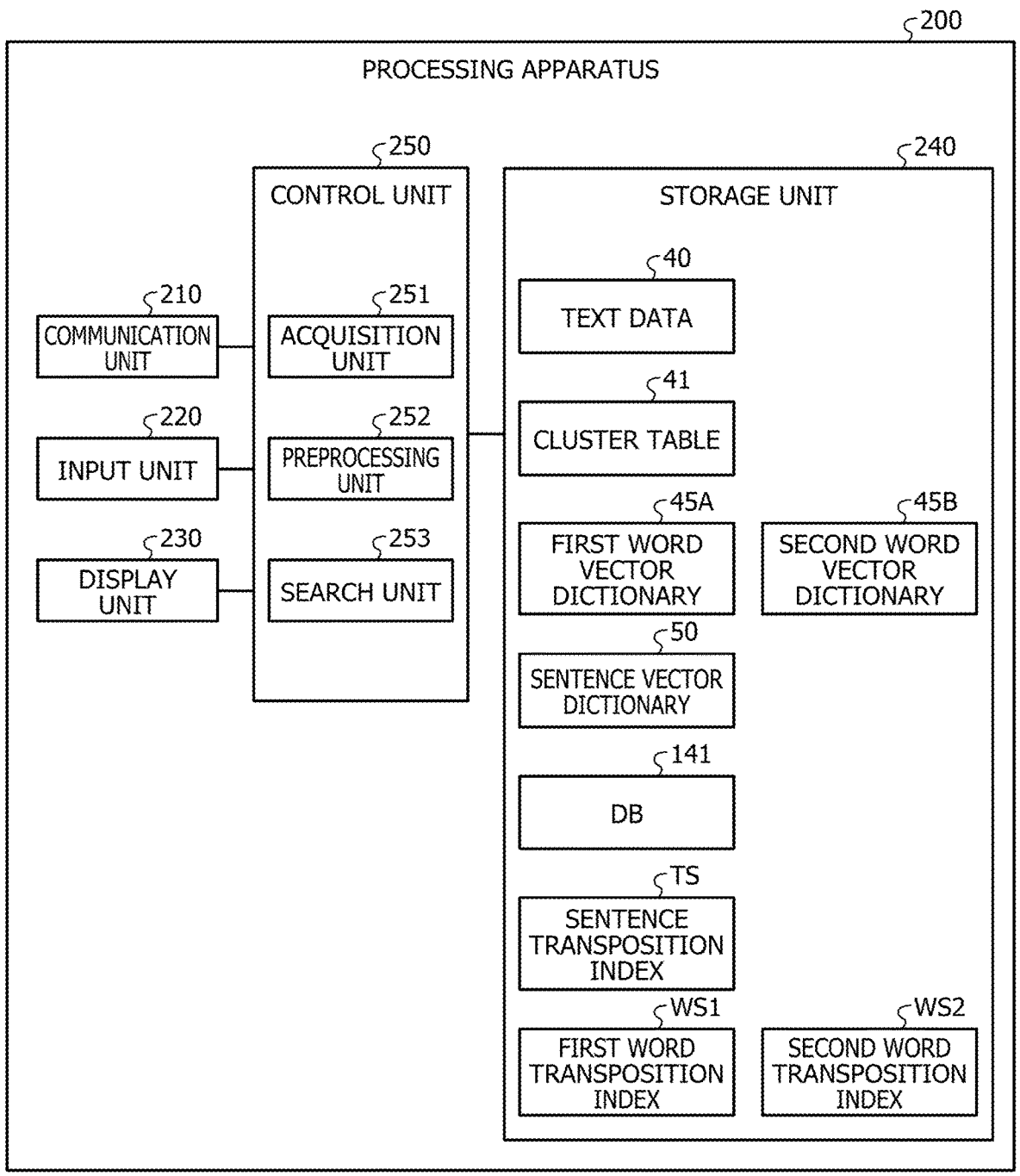
FIG. 15 is a functional block diagram illustrating a configuration of an information processing apparatus according to the second embodiment.

FIG. 15 is a functional block diagram illustrating a configuration of the information processing apparatus according to the second embodiment. As illustrated in FIG. 15, the information processing apparatus 200 includes a communication unit 210, an input unit 220, a display unit 230, a storage unit 240, and a control unit 250.

The description of the communication unit 210, the input unit 220, and the display unit 230 is the same as the description of the communication unit 110, the input unit 120, and the display unit 130 described in the first embodiment.

The storage unit 240 includes a text data 40, a cluster table 41, a first word vector dictionary 45A, a second word vector dictionary 45B, a sentence vector dictionary 50, a DB 141, and a sentence transposition index TS. The storage unit 240 includes a first word transposition index WS1 and a second word transposition index WS2. The storage unit 240 is realized by, for example, a semiconductor memory device such as a RAM or a flash memory, or a storage device such as a hard disk or an optical disk.

The text data 40 is information used to generate the sentence vector dictionary 50. The description of the text data 40 is the same as that of the first embodiment.

The cluster table 41 holds information about the cluster. The cluster table 41 associates the cluster ID with the cluster data. The cluster table 41 includes the cluster data based on a result of the clustering with the granularity of the sentence vector and the cluster data based on a result of the clustering with the granularity of the word vector.

The first word vector dictionary 45A is a table that defines codes and word vectors assigned to words. The first word vector dictionary 45A corresponds to the word vector dictionary 45 described with reference to FIG. 8.

The second word vector dictionary 45B associates the cluster ID, the representative vector, and the diameter based on the result of the clustering with the granularity of the word vector.

The sentence vector dictionary 50 associates the cluster ID, the representative vector, and the diameter based on a result of the clustering with the granularity of the sentence vector. The description of the sentence vector dictionary 50 is the same as that of the first embodiment.

The input text and the like are registered in the record of the DB 141.

The sentence transposition index TS associates the cluster ID to which the sentence vector belongs with the set of the record pointer and the position pointer. The description of the sentence transposition index TS is the same as that in the first embodiment.

The first word transposition index WS1 associates the word with the position information (the record pointer and the position pointer).

Figure 16:
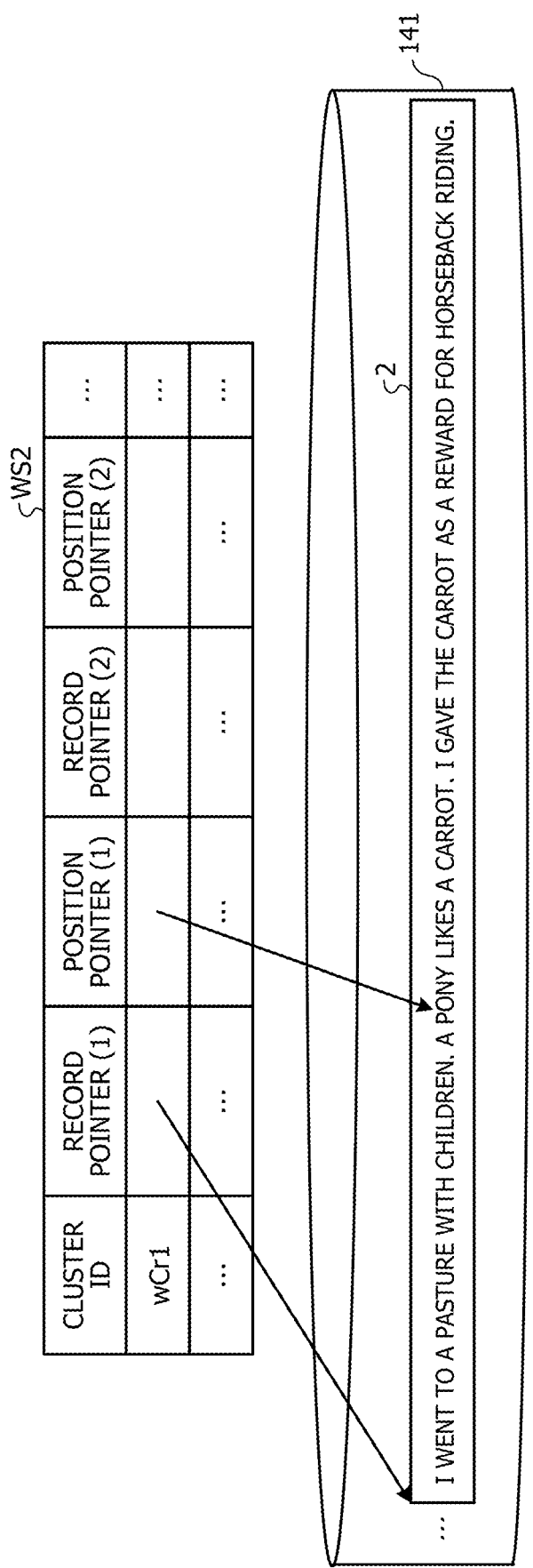
FIG. 16 is a diagram illustrating an example of a second word transposition index.

The second word transposition index WS2 associates the word with the position information (the record pointer and the position pointer). FIG. 16 is a diagram illustrating an example of the second word transposition index. The record pointer indicates a position on the record of the DB 141 in which the text having the word belonging to the corresponding cluster is registered and indicates a position from the head of the DB 141. The position pointer indicates a position on the record of the DB 141 in which the word belonging to the corresponding cluster is registered and indicates a relative position from the head of the corresponding record.

For example, when the word vector of the word "carrot" belongs to the cluster wCr1, the record pointer (1) is set to the head position of the input text 2 registered in the record of the DB 141 (the position from the head of the DB 141) in the second word transposition index WS2. The position of the word "carrot" registered in the DB 141 (the relative position from the head of the corresponding record) is set in the position pointer (1).

The description returns to FIG. 15. The control unit 250 includes an acquisition unit 251, a preprocessing unit 252, and a search unit 253. The control unit 250 is realized by, for example, a CPU or an MPU. Further, the control unit 150 may be implemented by an integrated circuit such as an ASIC or an FPGA.

The acquisition unit 251 acquires various data via the communication unit 210 and the input unit 220. For example, the acquisition unit 151 acquires the text data 40 and registers the text data 40 in the storage unit 240.

The preprocessing unit 252 generates the sentence transposition index TS, the first word index WS1, and the second word transposition index WS2 based on the text data 40. The process of generating the sentence transposition index TS by the preprocessing unit 252 is the same as that in the first embodiment.

A process of generating the first word transposition index WS1 by the preprocessing unit 252 will be described. The preprocessing unit 252 extracts a sentence included in the text data 40 and divides the sentence into a plurality of words by performing the morphological analysis. The preprocessing unit 252 registers the word and the position information (the record pointer and the position pointer) corresponding to the word in the first word transposition index WS1 in association with each other. It is assumed that the position information is position information based on the text data 40 registered in the DB 141. The preprocessing unit 252 repeatedly executes the above process for each word included in the text data 40.

A process of generating the second word transposition index WS2 by the preprocessing unit 252 will be described. The preprocessing unit 252 extracts a sentence included in the text data 40 and divides the sentence into a plurality of words by performing the morphological analysis. The preprocessing unit 252 compares each of the divided words with the first word vector dictionary 45A to specify a code corresponding to each word and replaces the code with the word. The preprocessing unit 252 specifies the word vectors (1) to (7) assigned to the code based on the first word vector dictionary 45A and each code.

The preprocessing unit 252 performs clustering with the granularity of the word vector, generates the cluster data for each cluster, and registers the cluster ID and the cluster data in the cluster table 41 in association with each other. The preprocessing unit 252 distinguishes the clustering result performed with the granularity of the word vector from the clustering result performed with the granularity of the sentence vector described in the first embodiment and registers the clustering result in the cluster table 41.

The cluster data executed with the granularity of the word vector includes the cluster ID, the representative vectors (1) to (7), and the diameter. The representative vectors (1) to (7) obtained with the granularity of the word vector are obtained by calculating the center of each component of each word vector. The preprocessing unit 252 registers the cluster ID, the representative vectors (1) to (7), and the diameter in the second word vector dictionary 45B.

When the preprocessing unit 252 receives the input text 2 to be registered in the DB 141, the preprocessing unit 252 generates the second word transposition index WS2 based on each word included in the input text 2, the first word vector dictionary 45A, and the second word vector dictionary 45B.

The preprocessing unit 252 selects the word included in the input text 2, compares the selected word with the word vector in the first word vector dictionary 45A, and specifies the word vector. The preprocessing unit 252 compares the word vector with the second word vector dictionary 45B and specifies the cluster ID to which the word vector belongs.

The preprocessing unit 252 registers the input text 2 in the DB 141. The preprocessing unit 252 registers the cluster ID to which the word vector belongs, the record pointer, and the position pointer in the second word inverted transposition index WS2 in association with one another.

When a search query is received, the search unit 253 searches for a sentence or a word corresponding to the search query from the DB 141 based on the search query, the sentence transposition index TS, and the second word transposition index WS2. When the search query is specified by "sentence", the same process as that of the search unit 153 described in the first embodiment is executed.

When the search query is specified by "word", the search unit 253 specifies the word vector based on the word of the search query and the first word vector dictionary 45A, and specifies the cluster ID to which the word belongs based on the word vector and the second word vector dictionary 45B. The search unit 253 compares the cluster ID to which the word of the search query belongs with the second word transposition index WS2, and searches the DB 141 for the word (or the sentence including the word) corresponding to the search query. The search unit 253 outputs the search result to the display unit 230 and displays the search result.

Even when the search query is specified by "sentence", the search unit 253 may perform the search by dividing the sentence into a plurality of words and executing the above-described process for each word.

Next, the effect of the information processing apparatus 200 according to the second embodiment will be described. The information processor 200 calculates word vectors of the plurality of words included in the text data 40, generates information on the plurality of clusters by performing clustering, and sets the cluster ID to which the word belongs in the second word vector dictionary 45B. For example, when registering a new input text in the DB 141, the information processor 200 may easily assign the cluster ID to which the word vector of the input text belongs by comparing the word vector of the input text with the second word vector dictionary 45B.

However, by applying the sentence transposition index TS described in the above embodiment to another process, the calculation cost for the other process may be reduced.

FIG. 17 is a diagram for explaining another application example of the sentence transposition index TS. For example, when a machine learning of a learning model M1 for translating a Japanese sentence into an English sentence is performed, training data T1 is used. The learning model M1 corresponds to a convolutional neural network (CNN), a recurrent neural network (RNN), an autoencoder, or the like. The training data T1 is training data in which the Japanese sentence is set as input data and the English sentence is set as ground truth data. For example, the Japanese sentence and the English sentence in the training data T1 may be converted into the cluster IDs using the sentence vector dictionary 50 or the second word vector dictionary 45B, and the machine learning may be executed using the cluster IDs. Thus, the same cluster ID is assigned to sentences (sentences belonging to the same cluster) which are similar with each other, and a number of kinds of sentences is reduced (degeneracy). Therefore, the amount of calculation of a SoftMax function or the like may be significantly reduced in the machine learning.

Note that in the first and second embodiments, the text composed of the character strings is described as an example, but a program, an organic compound, a genome, or the like may be used. Instructions/variables (programs), functional groups (organic compounds), protein basic structures kmer (genomes), or the like, which correspond to a word and have meanings, may also be used. Further, a line (program), a functional group primary structure (organic compound), a protein primary structure (genome), or the like, which correspond to a sentence, may also be used.

Figure 18:
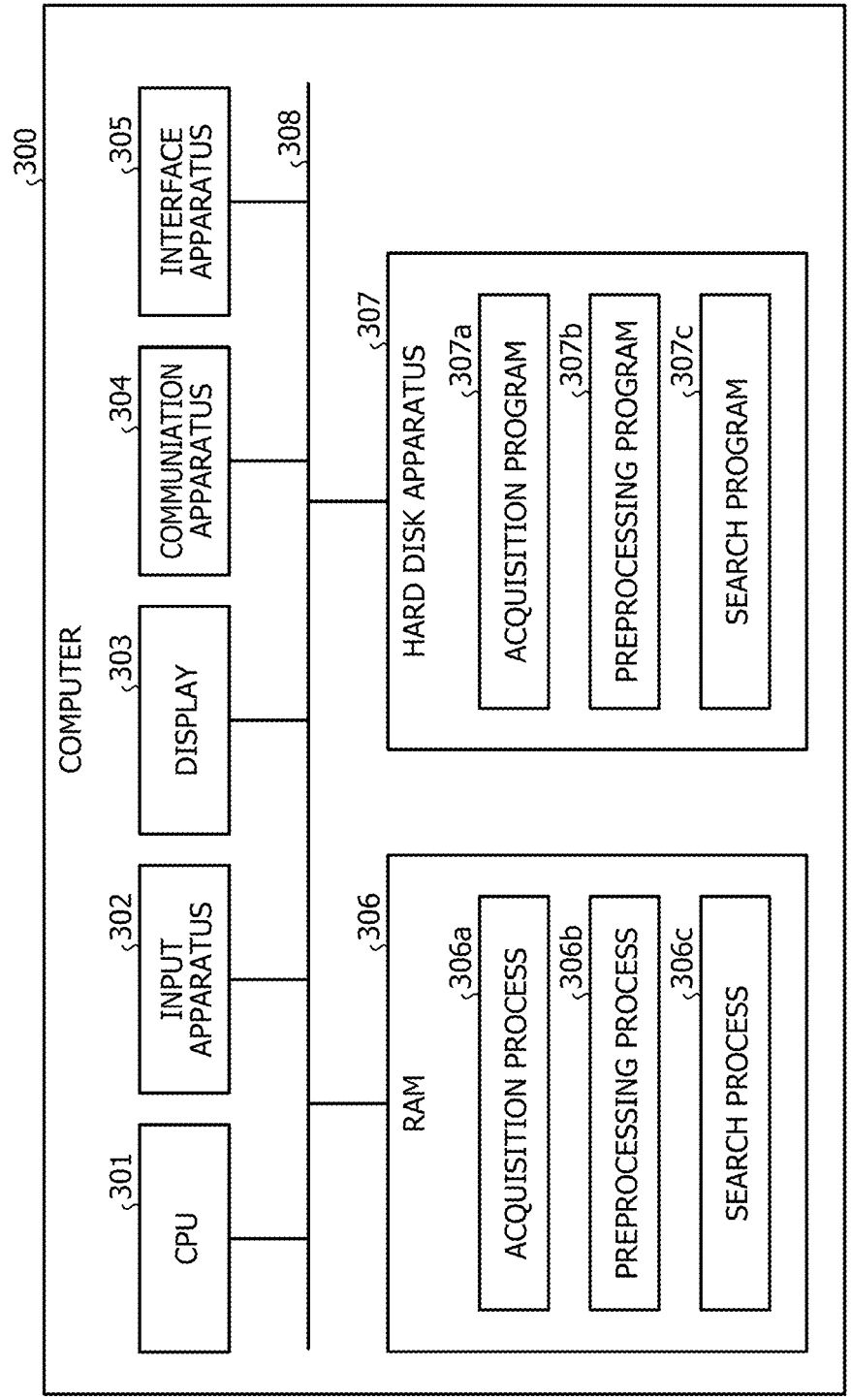
FIG. 18 is a diagram illustrating an example of a hardware configuration of a computer that realizes the same functions as those of the information processing apparatus according to the embodiment.

Next, an example of a hardware configuration of a computer that realizes the same function as that of the information processing apparatus 100 (200) described in the above embodiments will be described. FIG. 18 is a diagram illustrating an example of the hardware configuration of the computer that realizes the same function as that of the information processing apparatus according to the embodiment.

As illustrated in FIG. 18, a computer 300 includes a CPU 301 that executes various kinds of arithmetic processes, an input apparatus 302 that receives an input of data from a user, and a display 303. Further, the computer 300 also includes a communication apparatus 304 that transmits and receives data to and from an external device or the like via a wired or wireless network, and an interface apparatus 305.

Further, the computer 300 also includes a RAM 306 that temporarily stores various kinds of information and a hard disk apparatus 307. Further, the apparatuses 301 to 307 are coupled to a bus 308.

The hard disk apparatus 307 includes an acquisition program 307a, a preprocessing program 307b, and a search program 307c. In addition, the CPU 301 reads each of the programs 307a to 307c and develops the programs in the RAM 306.

The acquisition program 307a functions as an acquisition process 306a. The preprocessing program 307b functions as a preprocessing process 306b. The search program 307c functions as a search process 306c.

The acquisition process 306a corresponds to a process of the acquisition unit 151(251). The process of the preprocessing process 306b corresponds to a process of the preprocessing unit 152 (252). The process of the search process 306c corresponds to a process of the search unit 153 (253).

Note that each of the programs 307a to 307c may not necessarily be stored in the hard disk apparatus 307 from the beginning. For example, each program is stored in a "portable physical medium" such as a flexible disk (FD), a CD-ROM, a DVD, a magneto-optical disk, or an IC card which is inserted into the computer 300. Further, the computer 300 may also read and execute each of the programs 307a to 307c.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processing method comprising:
    calculating, when receiving a plurality of characters or a plurality of character strings to be registered in a database, a plurality of vectors corresponding to the plurality of characters or the plurality of character strings;
    classifying the plurality of vectors into a plurality of clusters according to inter-vector distances;
    acquiring, for each of the plurality of clusters, a representative vector which represents one or more vectors included in each cluster and a distance corresponding to a magnitude of the one or more vectors included in each cluster from the representative vector of each cluster;
    storing, in a memory, dictionary information in which the representative vector and the distance are associated with cluster identification information which identifies each of the plurality of clusters;
    identifying the cluster identification information corresponding to the plurality of vectors based on the plurality of vectors, the representative vector and the distance of the dictionary information; and
    generating index information in which the cluster identification information corresponding to the plurality of vectors is associated with position information, the position information being information that indicates: a position of the plurality of characters registered in the database or a position of the plurality of character strings registered in the database, wherein the position information includes a record pointer indicating a position of a record in the database where the plurality of characters or the plurality of character strings are registered, and a position pointer indicating a relative position of the plurality of characters or the plurality of character strings within the record.

2. The processing method according to claim 1, further comprising:
identifying, when receiving a search query is received, the cluster identification information corresponding to a vector of the search query based on the vector of the search query and the representative vector and the distance of the dictionary information; and
identifying the position information of the plurality of characters or the plurality of character strings corresponding to the search query based on the cluster identification information corresponding to the vector of the search query and the index information.

3. A non-transitory computer-readable recording medium storing a processing program causing a computer to execute a process of:
calculating, when receiving a plurality of characters or a plurality of character strings to be registered in a database, a plurality of vectors corresponding to the plurality of characters or the plurality of character strings;
classifying the plurality of vectors into a plurality of clusters according to inter-vector distances;
acquiring, for each of the plurality of clusters, a representative vector which represents one or more vectors included in each cluster and a distance corresponding to a magnitude of the one or more vectors included in each cluster from the representative vector of each cluster;
storing, in a memory, dictionary information in which the representative vector and the distance are associated with cluster identification information which identifies each of the plurality of clusters;
identifying the cluster identification information corresponding to the plurality of vectors based on the plurality of vectors, the representative vector and the distance of the dictionary information; and
generating index information in which the cluster identification information corresponding to the plurality of vectors is associated with position information, the position information being information that indicates: a position of the plurality of characters registered in the database or a position of the plurality of character strings registered in the database, wherein the position information includes a record pointer indicating a position of a record in the database where the plurality of characters or the plurality of character strings are registered, and a position pointer indicating a relative position of the plurality of characters or the plurality of character strings within the record.

4. The non-transitory computer-readable recording medium according to claim 3, wherein the process further includes:
identifying, when receiving a search query is received, the cluster identification information corresponding to a vector of the search query based on the vector of the search query and the representative vector and the distance of the dictionary information; and
identifying the position information of the plurality of characters or the plurality of character strings corresponding to the search query based on the cluster identification information corresponding to the vector of the search query and the index information.

5. An information processing apparatus comprising:
a memory; and
a processor coupled to the memory and configured to:
calculate, when receiving a plurality of characters or a plurality of character strings to be registered in a database, a plurality of vectors corresponding to the plurality of characters or the plurality of character strings;
classify the plurality of vectors into a plurality of clusters according to inter-vector distances;
acquire, for each of the plurality of clusters, a representative vector which represents one or more vectors included in each cluster and a distance corresponding to a magnitude of the one or more vectors included in each cluster from the representative vector of each cluster;
store, in the memory, dictionary information in which the representative vector and the distance are associated with cluster identification information which identifies each of the plurality of clusters;
identify the cluster identification information corresponding to the plurality of vectors based on the plurality of vectors, the representative vector and the distance of the dictionary information; and
generate index information in which the cluster identification information corresponding to the plurality of vectors is associated with position information, the position information being information that indicates: a position of the plurality of characters registered in the database or a position of the plurality of character strings registered in the database, wherein the position information includes a record pointer indicating a position of a record in the database where the plurality of characters or the plurality of character strings are registered, and a position pointer indicating a relative position of the plurality of characters or the plurality of character strings within the record.

6. The information processing apparatus according to claim 5, wherein the processor is further configured to:
identify, when receiving a search query is received, the cluster identification information corresponding to a vector of the search query based on the vector of the search query and the representative vector and the distance of the dictionary information; and
identify the position information of the plurality of characters or the plurality of character strings corresponding to the search query based on the cluster identification information corresponding to the vector of the search query and the index information.

* * * * *